March 12, 1968

P. V. FAGAN 3,373,046

PROCESS FOR THE MANUFACTURE OF COLLAGEN
CASINGS FROM LIMED HIDES

Filed June 15, 1965

INVENTOR.
PAUL V. FAGAN
BY Robert W. Kell
ATTORNEY

Fig. 2.

United States Patent Office 3,373,046
Patented Mar. 12, 1968

3,373,046
PROCESS FOR THE MANUFACTURE OF COLLAGEN CASINGS FROM LIMED HIDES
Paul V. Fagan, Bridgewater Township, Somerville, N.J., assignor to Johnson & Johnson, a corporation of New Jersey
Continuation-in-part of application Ser. No. 395,828, Sept. 11, 1964. This application June 15, 1965, Ser. No. 464,112
14 Claims. (Cl. 99—175)

ABSTRACT OF THE DISCLOSURE

Collagen sausage casings are prepared from limed hides by reacting the comminuted hides with a proteolytic enzyme. The hide particles are then acid swollen to form a fluid mass of acid-swollen collagen fibrils that is extruded in the form of a tube.

---

This is a continuation-in-part of application Ser. No. 395,828, filed Sept. 1, 1964, now abandoned. This invention relates to new and useful methods for producing a collagen tube from lime treated hides by continuous extrusion and to edible casings derived therefrom. The product of the invention is particularly adapted to be utilized as an edible casing for fresh pork sausages.

Natural casings, i.e., those prepared from the intestines of animals such as cattle, swine and sheep, suffer from a number of disadvantages which limit their acceptance. Tender edible casings can be obtained from optimum quality sheep intestines but because of their rarity and difficulties involved in their preparation, such tender edible casings command a high price. Other casings from the cleaned intestines of animals are frequently tough and unpleasant to eat. This is generally true of casings made from hog and beef intestines, but is also frequently the case when made from sheep intestines. In addition, the thickness of the wall and diameter of natural casings will vary, causing difficulty during modern high speed stuffing.

In view of the obvious deficiencies of natural casings and the expense of preparing such casings for human consumption, many attempts have been made to prepare a better edible casing from other sources of collagen.

A method of manufacturing artificial collagen casings from fresh unlimed cowhide is described in U.S. Patent No. 3,123,653. Collagen from fresh hides is converted by mechanical disintegration and the swelling action of acids under controlled conditions into a fluid mass of swollen collagen fibrils which may be extruded to form a tube. Although such extruded tubular bodies are quite fragile, the cowhide collagen may be coagulated in a concentrated solution of ammonium sulfate to form a tube having sufficient tensile strength to permit hardening the coagulated tube, washing coagulant from the hardened tube and drying said tube in a continuous process.

Attempts to manufacture an artificial collagen casing by the method described in U.S. Patent No. 3,123,653, but substituting for the starting material a homogeneous mass of acid-swollen animal tendon or limed cowhide failed because the extruded tube falls apart and disintegrates in the coagulation bath. These experiments suggest that collagen derived from limed hides and animal tendon is unsuitable for use in the continuous extrusion of tubular casings. In spite of these disappointments, however, efforts were continued to utilize limed hides and tendon as a source of collagen for the manufacture of artificial casings.

Efforts were made to improve the extrusion characteristics of acid-swollen collagen derived from limed hides by adding thereto from about 5% to about 20% by weight of gelatin. The extrusion of this material produces an extremely fragile tubular body lacking in cohesive strength and difficulty is experienced in properly coagulating, hardening and handling the material during processing. During the initial coagulation with ammonium sulfate the extruded tubular body does not acquire the tangible form and integrity of its own, but remains weak, fragile and invariably breaks as it passes in the wet state through subsequent conditioning treatments.

It was also determined that finely divided tendon collagen treated at room temperature with an elastase, such as fiein, for about 5 to 24 hours prior to acid-swelling results in a collagen mass that may be extruded in the form of a tube into a coagulating bath. The collagen tube obtained under these conditions has sufficient tensile strength to permit hardening the coagulated tube, washing coagulant from the hardened tube, and drying said tube in a continuous process. Moreover, the reconstituted casing manufactured from enzyme-treated tendon collagen is sufficiently strong to withstand the stuffing and linking operation and produces a tender, edible sausage of excellent appearance. It is a disadvantage of reconstituted casings prepared from enzyme-treated tendon collagen, however, that they melt at elevated temperatures and do not survive the frying process.

In accordance with the present invention, it has now been discovered that the treatment of limed hides under controlled conditions with specific amounts of an enzyme enables one to prepare an acid dispersion of the enzyme-treated limed hide that may be extruded into a coagulating bath containing an inorganic salt such as ammonium sulfate. The thin-walled tubular casing material formed by extrusion from such a relatively watery mass of enzyme-treated acid-swollen limed cowhide when subjected to the post-treatments of the present invention will produce sausage casings which are very tender and so easy to masticate that in eating they can scarcely be distinguished from the sausage meat itself. Sausage casings that are prepared in accordance with the present invention have sufficient tensile strength and burst strength to be shirred, stuffed and linked using commercial equipment without undue rupture or stretching. Moreover, such casings have been found to survive the stresses and temperatures involved in cooking in the frying pan so that there is substantially no shrinkage, rupturing or melting of the casing or extrusion of the meat product therefrom during the cooking process.

In treating the limed hides to convert them into starting material that is suitable for the process to be described, the lime may be first neutralized by soaking the hides in a dilute acid solution. Neutralization of the lime is not necessary but does appear to facilitate washing the hide as the water soluble calcium salts formed during the acid treatment are readily removed by washing with water. The cowhide is then treated at room temperature with an aqueous solution of an enzyme. Tetrasodium ethyelne diamine tetraacetic acid and disodium ethylene diamine tetraacetic acid are sequestering agents for calcium and the use of these salts in combination with an enzyme assists in the further removal of calcium. The concentration of enzyme in solution will depend upon the particular enzyme used and may vary from about 0.1% to about 15% by weight. The pH of the enzyme solution is in the range of about 4 to about 9. The cowhide is immersed in the enzyme solution for from about 8 to about 24 hours depending on the temperature of the solution.

Enzymes that have been found suitable for the treatment of limed hides in accordance with the present invention are proteolytic enzymes, such as: $\alpha$-amylase, bromelin, ficin, pancreatin, papain, pepsin, steapsin, and trypsin.

If it is desired to destroy the residual enzyme before the cowhide is dispersed in an acid solution to form the extrusion mass, this may be accomplished by treating the hide with dilute hydrogen peroxide and careful washing. Non-collagenous fillers such as cellulose fibers and starch particles may be added to the acid swollen collagen mass prior to extrusion. Such fillers in the amount of 5% to 40% of the collagen solids improves the cooking response of the casing.

It is an object of the present invention to extrude into an aqueous salt bath a collagen casing derived from limed cowhide that may be washed, hardened and shirred on modern high-speed machinery.

Another object of this invention is to produce strong thin-walled casings from limed cowhide which, when stuffed with sausage emulsion, are edible after cooking; which do not burst, rupture or melt under the stress and temperatures of cooking; and which do not shrink or extrude emulsion during cooking.

It will be understood that the foregoing general description and the following detailed description as well are exemplary and explanatory but are not restrictive of the invention.

The process for the manufacture of extruded collagen articles of the present invention may be more fully understood from the following detailed description and examples taken in connection with the accompanying drawings wherein.

Throughout the specification and examples that follow, all quantities are expressed in parts by weight unless otherwise indicated.

*Example I.—Ficin*

Pieces of limed split cowhide are cut into pieces approximately 8 inches square and treated with acetic acid to neutralize the lime. Five thousand parts of the limed hide pieces are treated overnight (16–18 hours) with an aqueous solution of 95 to 100 parts of glacial acetic acid in 10,000 parts of water. The hides are agitated gently throughout this acid treatment.

The acid solution is drained off, and the hide pieces are washed for two hours with water. Two complete changes of water are used for this washing step.

Ten thousand parts of an enzyme solution containing 0.1% ficin, and 0.3% of the disodium salt of ethylene diamine tetraacetic acid is added to the washed hide pieces and the hide is agitated in this solution for 24 hours at room temperature (24° C.). The pH of this ficin solution is 6.5.

The enzyme solution is drained away from the hide pieces which are again washed with agitation in two changes of water. The hide is then agitated for ten hours with 10,000 parts of an aqueous solution containing 0.1% hydrogen peroxide. At the end of this time the peroxide solution is drained off and the hides washed again for an additional two hours with water.

The hide pieces are cut into smaller strips and ground in a meat grinder through ¾ inch holes. The ground hide is then reduced to smaller size by grinding through ⅜ and 5/64 inch holes. The ground hide so obtained is swollen in an aqueous lactic acid solution to form a mixture containing 3.8% hide solids, 1.2% lactic acid, and 0.7% hardwood cellulose fiber. After swelling for 18 hours this mixture is further dispersed in a suitable homogenizer such as a Manton-Gaulin homogenizer (Model 125–K-5BS), fitted with a two-stage valve and operated with a 1500 p.s.i. drop per stage.

The fluid mass of swollen collagen so obtained is extruded in the form of a tube, in such a way as to impart some collagen fibril orientation transverse to the direction of extrusion. The particular design and operation of the extruder constitutes no essential part of the present invention, but it has been found preferable to utilize the action of the extruder to effect the maximum homogeneity of fibril distribution so as to impart substantial burst strength and transverse tear strength to the tube and ultimate casing while also effecting orientation or alignment of fibrils or masses of fibrils in the direction of extrusion, particularly those adjacent the tube walls, thereby to achieve substantial longitudinal or tensile strength as well. One form of extruder found useful in practicing the invention is described and claimed in U.S. Patent No. 3,122,788.

Figure 1:
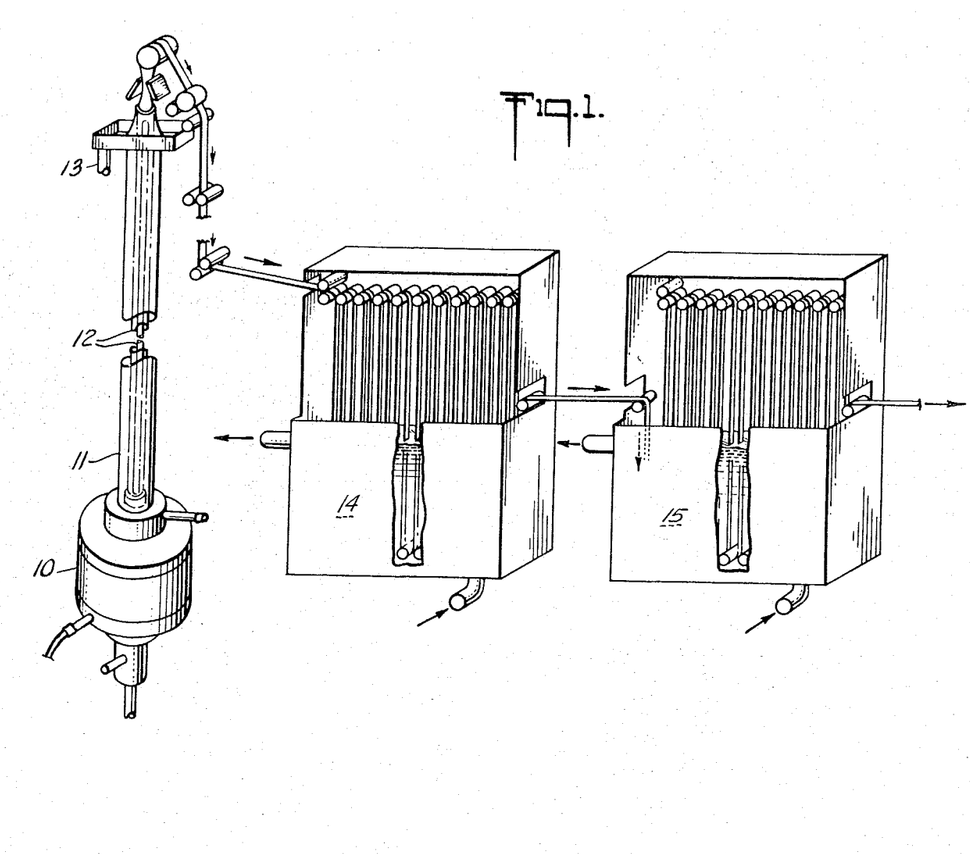
FIGURES 1 and 2 are flow diagrams illustrating the sequence of steps in the continuous manufacture of a collagen casing in accordance with the present invention.

With reference to FIG. 1 the extruded fluid mass of swollen collagen and cellulose fibers leaves the orifice of the extruder 10 in the form of a tubular body of watery fluid travelling upwardly into a dehydrating or coagulating bath (a saturated solution of ammonium sulfate in water) which surrounds the orifice of the extruder and extends upwardly therefrom.

The initial coagulating bath into which the extruded tubular body immediately passes is in the form of a vertical column of liquid constituting a housing 11 surrounding and extending upwardly from the extruder orifice. A portion of this liquid flows upwardly within the extruded tubular body, passing between the extruded body and an internally disposed over-flow or return tube 12. The flow rate within the extruded body is quite slow, to avoid pressures and velocities harmful to the delicate extruded body, and may be, e.g., about 1 gallon per hour. Another portion of the coagulating liquid flows upwardly in the housing outside the extruded tubular body and returns through an external overflow drain 13 for recirculation. The flow rate of said outside column of liquid may be relatively rapid, e.g., about 2 gallons per minute. Thus the inside and outside of the tubular body are initially bathed in upwardly flowing columns of a coagulating liquid.

It should be noted that the density of the extruded tubular body as it comes from the extruder orifice is substantially less than that of the coagulating salt solution into which it passes. Accordingly the tendency of the extruded tubular body is to rise and travel naturally upwardly in the coagulating liquid. This phenomenon facilitates the starting up of the extruder and the maintenance of the desired upward travel of the tubular body with the exertion of a minimum of external forces thereupon. This action occurs at that stage in the treatment of the tubular body when it is weakest and most fragile and possesses virtually no integrity of its own.

After reaching the top of the liquid housing, the tubular body is passed into and through a batch 14 of the coagulating liquid for a total coagulating exposure of 15 minutes. This coagulating treatment is the first conditioning step applied after extrusion of the tubular body. The coagulating bath 14 is an aqueous ammonium sulfate solution containing about 40% ammonium sulfate adjusted to a pH substantially higher than that of the acid-swollen collagen material, e.g., a pH of about 7.0 with some suitable alkaline material such as sodium or ammonium hydroxide. The coagulating liquids in the vertical housing above the extruder and in said bath 14 are of the same aforesaid composition. The purpose served by these coagulating baths is primarily to replace the water in the extruded tubular body by ammonium sulfate solution, thereby coagulating and giving temporary form and integrity to the tubular body so that it may be handled in the subsequent conditioning operations.

The tubular body when it passes from the extrusion nozzle or orifice, has a wall thickness determined by the annular space between the internal and external extruder tubes forming the orifice. In a preferred embodiment of the invention the external diameter of the inner extrusion tube is about .75″ while the radial distance between the exterior of said inner tube and the interior wall of the external tube is about .014″. Thus the tubular body referred to will have an initial wall thickness of about .014″ (14 mils) and this thickness will be substantially maintained throughout most of the liquid conditioning treatments as hereinafter described. Ultimately, in accordance with the invention, the dried tubular body will be reduced to a wall thickness of the order of .001″ (1 mil), but the initial inner diameter of about .75″ will be preserved. These dimensions are given by way of example and are not limiting, but do illustrate the relatively great reduction in wall thickness required and achieved to practice of the invention. The casing diameter of about .75″ is typical of casings used for fresh pork sausages.

As a second conditioning step the concentration of coagulating salt in the coagulated tubular body is substantially reduced, thereby to facilitate the hardening action hereinafter described. In the preferred embodiment of the invention, hardening is effected by treatment with alum and it has been found that such treatment is effective only when the concentration of ammonium sulfate in the tubular body has been substantially reduced, yet a sufficient amount thereof retained pro tem to avoid undue softening and weakening of the coagulated tubular body. Accordingly the tubular body is pre-washed for a period of about six minutes in a tank 15 which contains a diluted water solution of ammonium sulfate (e.g., about 4% to 18%) similarly adjusted to pH of about 6.5.

Figure 2:
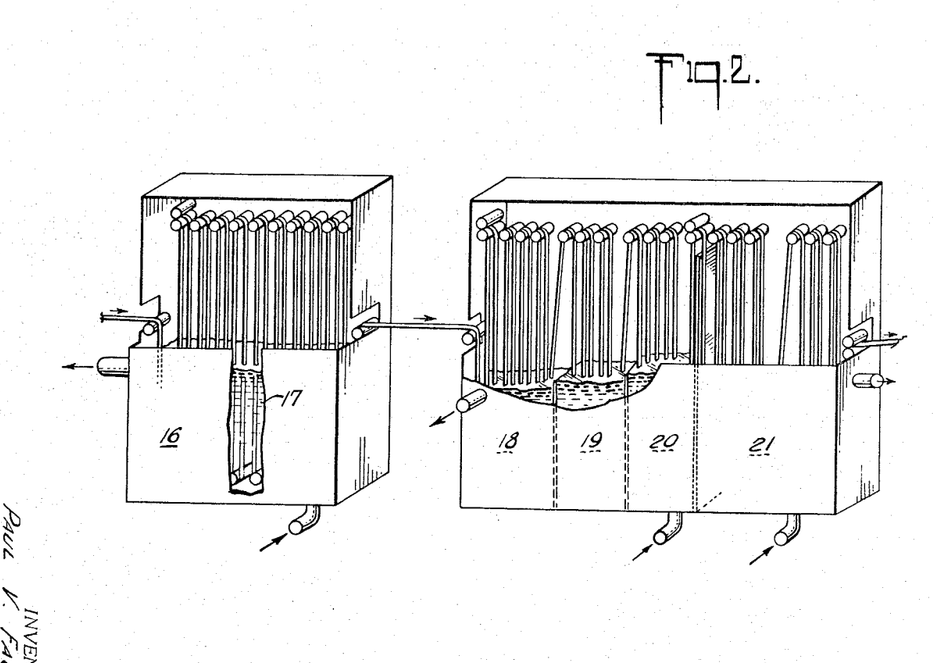

Referring now to FIG. 2, a third conditioning step constitutes a hardening of the coagulated casing by reaction of the collagen therein to alum. For this purpose the pre-washed coagulated tubular body is immersed in a tank 16 and treated with a solution 17 containing, e.g., about 4% alum $(NH_4Al(SO_4)_2 \cdot 24H_2O)$, 1% citric acid and 6% ammonium sulfate. The contact time is about fifteen minutes and this alum hardening solution is maintained at pH 4.3.

This hardening treatment is sometimes called "tanning," but the primary purpose is to effect a hardening of the casing so as to make it resistant to water, which is not the case with collagen coagulated with ammonium sulfate. Without such hardening action the application of water to the tubular body coagulated with ammonium sulfate would reduce it to a formless gel. In other words the coagulation with ammonium sulfate is essentially a temporary step after which a more permanent hardening action is effected by treatment with alum. More detailed descriptions of the alum treatment with various examples thereof are given in U.S. Patent No. 3,123,481.

The fourth conditioning step involves a removal of the ammonium sulfate salt which has remained in the tubular body after the pre-wash and alum hardening steps. This excess ammonium sulfate as well as any excess alum in tubular body are removed in tanks 18, 19 and 20 by a prolonged washing of the tubular body in tap water, e.g., for about thirty minutes.

The fifth step in the conditioning of the tubular body is called a plasticizing operation. This procedure involves essentially the application of a humectant such as glycerine which preserves the softness of the material after drying and helps in rehumidifying it. This plasticizing material also prevents cracking and other effects consequent upon undue drying. In the present example, the plasticizing bath 21 contains 3.0% glycerol. The dwell time in this bath is about twelve minutes.

As the next or sixth conditioning step, the hardened, plasticized and partially solidified tubular body is dried by hot air currents. For this purpose the casing is inflated by blowing air into and through the length thereof as it passes into a drying chamber (not illustrated in the drawings) while at the same time warm air is blown over and around the exterior. This drying air is at approximately 70% C. and 8% relative humidity and the casing is subjected to such treatment until the wall thickness of the tubular body has been reduced to about 1 mil in the example under discussion. Great care is taken during this step to prevent expansion or stretching of the air-inflated casing beyond the internal diameter imparted to it by the extrusion, e.g., 0.75 inch in the example given. The achievement of suitable drying can be determined by visual inspection, the dried casing tube being translucent, while the presence of moisture is indicated by a whitish, opaque color.

The dried casing tube may then be subjected to automatic shirring and shirred lengths severed to form casings which are adapted to be stuffed on automatic stuffing machines. As a final step, prior to stuffing but after shirring, the casing is preferably subjected to a heat-curing treatment. This treatment comprises storage for about eight hours at a rising temperature bringing the casing material from room temperature to about 80° C. It is then maintained at 80° C. for some sixteen hours more, which completes the heat-curing thereof.

While the moisture removal effected in the drying chamber described above may reduce the inherent moisture in the tubing to as low as about 20%, the ultimate moisture content after heat-curing is preferably in the range of 10% to 30% by weight, i.e., giving a solids content in the approximate range of 70% to 90%.

The heat-curing described above has the effect of increasing the hot tensile strength in stuffing. It is believed that this heat-curing operation accomplishes some cross-linking or so-called tanning.

The casing after this heat-curing step will contain from about 10% to about 30% by weight of moisture and will pick up additional moisture if allowed to equilibrate at room temperature and humidity. Such casings will stuff satisfactorily if equilibrated at room temperature and a relative humidity of about 75%. To maintain the desired moisture content for stuffing, the so-rehumidified casings are preferably packaged in hermetically sealed containers of metal foil or the like.

The casing prepared as described above passed stuffing, linking and cooking tests. A sample of this casing which had been heat cured for 32 hours at 80° C. instead of 24 hours had similar properties.

*Example II.—Ficin*

Limed cowhide is neutralized to pH 7.6 with lactic acid, washed thoroughly and ground to a particle size of approximately ¾″ diameter. The hide particles are then treated overnight at room temperature with a solution containing 0.1% ficin and 0.3% Versene (the tetrasodium salt of ethylene diamine tetraacetic acid) at pH 6.5. The ficin is destroyed with hydrogen peroxide as described in Example I above, and the enzyme-treated hide is dispersed with cellulose in a solution of lactic acid to produce an extrusion mass having the following composition:

| | Percent |
|---|---|
| Enzyme treated Limed Hide Solids | 4.0 |
| Hardwood Cellulose | 0.8 |
| Lactic Acid | 1.2 |
| Water | 94 |

This hide-cellulose mixture is extruded as described in Example I above, pre-washed for 6 minutes in 10% ammonium sulfate solution at pH 7, and hardened for 6 minutes in a solution adjusted to pH 4.3 containing 6% alum, $NH_4Al(SO_4)_2 \cdot 24H_2O$, 1% citric acid and 4% ammonium sulfate. The hardened casing is washed for about 14 minutes and plasticized for 5 minutes in a bath containing 5% glycerol.

The hardened plasticized and partially solidified tubular body dried at temperatures in the range of 60°–70° C. by hot air currents is then shirred. The casing is subjected to further heat-treatment at about 80° C. and about 20–30% relative humidity for about 24 hours. This additional heat curing step may be eliminated if a small amount of formaldehyde (as little as 20 parts per million) is added to the hardening or plasticizing bath.

The casing, after the heat curing step, is stored in a constant temperature and constant humidity room until the moisture content of the casing is between 10% and 30% by weight. Such casings will stuff satisfactorily if equilibrated at a room temperature and a relative humidity of about 75%. To maintain the desired moisture content for stuffing, the so-rehumidified casings are packaged in hermetically sealed containers of metal foil or the like.

Example III.—α amylase

Commercial limed hides containing about 8% ash and between about 2% and about 4% calcium (calculated as $CaSO_4$) as received from the tannery are washed in a drum with 1–2 gallons of water per minute for 8 to 12 hours. This reduces the total ash and calcium to 1.5%–2.5% and 0.8%–1.2%, respectively.

The washed hides are shredded with rapidly rotating knives in a machine of the type conventionally used to shred paper and ground in a meat grinder through ¼ inch holes.

The washed and ground hide (30 parts) is next treated with 300 parts of a buffered aqueous solution containing 1 part α-amylase for 18 hours at 22–23° C. The pH of the amylase solution is 4.

The α-amylase treated hide is washed and cut into ⅟₁₆″ particles. These hide particles are then swollen in aqueous acid solution and blended with cellulose fibers to produce an extrusion mass having the following composition:

| | Percent |
|---|---|
| Hide solids | 3.6 |
| Cellulose fibers | 0.75 |
| Lactic acid | 1.2 |
| Water | 94.44 |

The mixture is homogenized and extruded into a saturated ammonium sulfate solution as described in Example I. The breaking strength of the extruded casing as it enters the pre-wash tank 15 is 360 grams. The extruded casing is pre-washed in 14% aqueous ammonium sulfate solution for about 24 minutes and hardened in an aqueous solution containing 3% alum, $NH_4AL(SO_4)_2 \cdot 24H_2O$, 0.67% citric acid and 3.2% ammonium sulfate adjusted to pH 4.3 with ammonium hydroxide. The strength of the casing in the pre-wash tank 15 is 350 grams and the casing strength increases in the alum hardening tank 16 to 400 grams. The casing remains in this hardening solution for about 35 minutes, and is washed with water for about 2 hours. During the washing step the strength of the casing is 450 grams in tank 18, 450 grams in tank 19 and 320 grams in tank 20. The washed casing is plasticized for about 15 minutes with an aqueous solution containing 3% glycerol and 1% C.M.C. (the sodium salt of carboxymethyl cellulose). The strength of the casing in the plasticizing bath is 430 grams. The plasticized casing is dried in an inflated condition for about 3 minutes at about 80° C., and shirred. The shirred casing is heated slowly from room temperature to 80° C. over a period of 8 hours and finally is heated for another 16 hours at about 80° C. The stuffing and linking properties of the casing so obtained are satisfactory. Sausages manufactured with this casing survive cooking, i.e., do not rupture, split or melt.

In a series of experiments with the enzyme α-amylase, the pH of the enzyme solution is adjusted to 6, 7.5 and 9 while the other conditions of this Example III remain unchanged. In every experiment the collagen mass extruded satisfactorily to produce a casing having satisfactory properties. Increasing the amount of α-amylase in solution to 2 parts and even to 3 parts by weight also gives satisfactory results although no real advantage is noted that would justify the expense of using these larger quantities of enzyme (and removing the residual enzyme from the hide after enzyme treatment).

Example IV.—Bromelin

Commercial limed hides as received from the tannery are washed in a drum with 1–2 gallons of water per minute for 8 to 12 hours.

The washed hides are shredded with rapidly rotating knives in a machine of the type conventionally used to shred paper and ground in a meat grinder through ¼ inch holes.

Thirty parts by weight of the washed and ground hide is next treated with an aqueous buffered solution containing 1 part of bromelin for 18 hours at 22–23° C. The pH of the bromelin solution is 4.

The bromelin treated hide is washed and cut into ⅟₁₆″ particles. These hide particles are then swollen in aqueous acid solution and blended with cellulose fibers to produce an extrusion mass having the composition indicated in Example III. The mixture is homogenized and extruded into a saturated ammonium sulfate solution as described in Example I. The breaking strength of the extruded casing as it enters the pre-wash tank 15 is 556 grams. The extruded casing is pre-washed in 14% aqueous ammonium sulfate solution for about 24 minutes and hardened in an aqueous solution containing 3% alum, 0.67% citric acid and 3.2% ammonium sulfate adjusted to pH 4.3 with ammonium hydroxide. The strength of the casing in the pre-wash tank 15 is 475 grams and the casing strength increases in the alum hardening tank 16 to 675 grams. The casing remains in this hardening solution for about 35 minutes, and is washed with water for about 2 hours. During the washing step the strength of the casing is 720 grams in tank 18, 500 grams in tank 19 and 450 grams in tank 20. The washed casing is plasticized for about 15 minutes with an aqueous solution containing 3% glycerol and 1% C.M.C. The strength of the casing in the plasticizing bath is 525 grams. The plasticized casing is dried in an inflated condition for about 3 minutes at about 80° C., and shirred. The shirred casing is heated slowly from room temperature to 80° C. over a period of 8 hours and finally is heated for another 16 hours at about 800° C. The stuffing and linking properties of the casing so obtained are satisfactory. Sausages manufactured with this casing survive cooking, i.e., do not rupture, split or melt.

In a series of experiments the concentration of the enzyme bromelin in solution was decreased to 0.5 part by weight and the pH of the enzyme solution is adjusted to 6, 7.5 and 9, and while the other conditions of this Example IV remained unchanged. The collagen mass extruded satisfactorily. Increasing the amount of bromelin in solution to 2 parts also gives satisfactory results.

Example V.—Ficin

Commercial limed hides as received from the tannery are washed in a drum with 1–2 gallons of water per minute for 8 to 12 hours.

The washed hides are shredded with rapidly rotating knives in a machine of the type conventionally used to shred paper and ground in a meat grinder through ¼ inch holes.

Thirty parts of the washed and ground hide is next treated with 300 parts of an aqueous buffered .067% solution of ficin for 18 hours at 22–23° C. The pH of the ficin solution is 7.0.

The ficin treated hide is washed and cut into 1/16" particles. These hide particles are then swollen in aqueous acid solution and blended with cellulose fibers to produce an extrusion mass having the following composition:

| | Percent |
|---|---|
| Hide solids | 3.6 |
| Cellulose fibers | 0.76 |
| Lactic acid | 1.2 |
| Water | 94.44 |

The mixture is homogenized and extruded into a saturated ammonium sulfate solution as described in Example I. The breaking strength of the extruded casing as it enters the pre-wash tank 15 is 320 grams. The extruded casing is pre-washed in 14% aqueous ammonium sulfate solution for about 24 minutes and hardened in an equeous solution containing 3% alum, 0.67% citric acid and 3.2% ammonium sulfate adjusted to pH 4.3 with ammonium hydroxide. The strength of the casing in the alum hardening tank 16 is 500 grams. The casing remains in this hardening solution for about 35 minutes, and is washed with water for about 2 hours. During the washing step the strength of the casing is 480 grams in tank 18, 500 grams in tank 19 and 550 grams in tank 20. The washed casing is plasticized for about 15 minutes with an aqueous solution containing 3% glycerol and 1% C.M.C. The strength of the casing in the plasticizing bath is 600 grams. The plasticized casing is dried in an inflated condition for about 3 minutes at about 80° C. and shirred. The shirred casing is heated slowly from room temperature to 80° C. over a period of 8 hours and finally is heated for another 16 hours at about 80° C. The stuffing and linking properties of the casing so obtained are satisfactory. Sausages manufactured with this casing survive cooking, i.e., do not rupture, split or melt.

In a series of experiments with the enzyme ficin the pH of the enzyme solution is adjusted to 4, 6, 7.5 and 9, while the other conditions of this Example V remained unchanged. There is no significant alternation of the extrusion properties of the collagen mass nor in the properties of the final product. Decreasing the amount of ficin in solution to .033% and even to .016% also gives satisfactory results although no real advantage is noted that would justify the expense of using these larger quantities of enzyme (and removing the residual enzyme from the hide after enzyme treatment).

*Example VI.—Pancreatin*

Commercial limed hides as received from the tannery are washed in a drum with 1–2 gallons of water per minute for 8 to 12 hours.

The washed hides are shredded with rapidly rotating knives in a machine of the type conventionally used to shred paper and ground in a meat grinder through 1/4 inch holes.

Thirty parts of the washed and ground hide is next treated with 300 parts of an aqueous 0.66% solution of pancreatin for 18 hours at 22–23° C. The pH of the pancreatin solution is buffered to 7.5.

The pancreatin treated hide is washed and cut into 1/16" particles. These hide particles are then swollen in aqueous acid solution and blend with cellulose fibers to produce an extrusion mass having the composition indicated in Example V. The mixture is then homogenized and extruded into a saturated ammonium sulfate solution as described in Example I. The breaking strength of the extruded casing as it enters the pre-wash tank 15 as 613 grams. The extruded casing is pre-washed in 14% aqueous ammonium sulfate solution for about 24 minutes and hardened in an aqueous solution containing 3% alum, 0.67% citric acid and 3.2% ammonium sulfate adjusted to pH 4.3 with ammonium hydroxide. The strength of the casing in the pre-wash tank 15 is 575 grams and the casing strength increases in the alum hardening tank 16 to 600 grams. The casing remains in this hardening solution for about 35 minutes, and is washed with water for about 2 hours. During the washing step the strength of the casing is 650 grams in tank 18, 550 grams in tank 19 and 500 grams in tank 20. The washed casing is plasticized for about 15 minutes with an aqueous solution containing 3% glycerol and 1% C.M.C. The strength of the casing in the plasticizing bath is 600 grams. The plasticized casing is dried in an inflated condition for about 3 minutes at about 80° C., and shirred. The shirred casing is heated slowly from room temperature to 80° C. over a period of 8 hours and finally is heated for another 16 hours at about 80° C. The stuffing and linking properties of the casing so obtained are satisfactory. Sausages manufactured with this casing survive cooking, i.e., do not rupture, split or melt.

In a series of experiments the concentration of pancreatin in solution was decreased to 3.33% based on the weight of the dry hide and the pH of the enzyme solution is adjusted to 4, 6, 7.5 and 9, while the other conditions of this Example VI remained unchanged. The collagen mass obtained in each instance could be extruded to produce a satisfactory collagen casing. Increasing the amount of pancreatin in solution to 9.99% and even to 15% based on the weight of the dry collagen solids, also gives satisfactory results, although no real advantage is noted that would justify the expense of using these larger quantities of enzyme (and removing the residual enzyme from the hide after enzyme treatment).

*Example VII.—Papain*

Commercial limed hides as received from the tannery are washed in a drum with 1–2 gallons of water per minute for 8 to 12 hours.

The washed hides are shredded with rapidly rotating knives in a machine of the type conventionally used to shred paper and ground in a meet grinder through 1/4 inch holes.

The washed and ground hide (30 parts by weight dry solids) is next treated with 300 parts of an aqueous solution containing 0.498 part papain for 18 hours at 22–23° C. Prior to use, the papain is activiated with cysteine and the tetrasodium salt of ethylenediamine tetraacetic acid. Citric acid and sodium citrate are used as buffers to adjust the pH of the papain solution to 4.

The papain treated hide is washed and cut into 1/16" particles. These hide particles are then swollen in aqueous acid solution and blended with cellulose fibers to produce an extrusion mass containing 3.6% hide solids, 0.76% cellulose fibers, 1.2% lactic acid, and 94.44% water. The mixture is homogenized and extruded into a saturated ammonium sulfate solution as described in Example I. The breaking strength of the extruded casing as it enters the pre-wash tank 15 is 550 grams. The extruded casing is prewashed in 14% aqueous ammonium sulfate solution for about 24 minutes and hardened in an aqueous solution containing 3% alum, $NH_4Al(SO_4)_2 \cdot 24H_2O$, 0.67 citric acid and 3.2% ammonium sulfate adjusted to pH 4.3 with ammonium hydroxide. The strength of the casing in the pre-wash tank 15 is 500 grams and the casing strength decreases in the alum hardening tank 16 to 480 grams. The casing remains in this hardening solution for about 35 minutes, and is washed with water for about 2 hours. During the washing step the strength of the casing is 520 grams in tank 18, 540 grams in tank 19 and 480 grams in tank 20. The washed casing is plasticized for about 15 minutes with an aqueous solution containing 3% glycerol and 1% C.M.C. (the sodium salt of carboxymethyl cellulose). The strength of the casing in the plasticizing bath is 520 grams. The plasticized casing is dried in an inflated condition for about 3 minutes at about 80° C. and shirred. The shirred casing is heated slowly from room temperature at 80° C. over a period of 8 hours and finally is heated for another 16 hours at about 80° C. The stuffing and linking properties of the casing so obtained are satisfactory. Sausages manufactured with this casing survive cooking, i.e., do not rupture, split or melt.

In a series of experiments with the enzyme papain, the pH of the enzyme solution is adjusted with buffers to 6, 7.5 and 9, while the other conditions of this Example VII remained unchanged. There is no alteration of the extrusion properties of the collagen mass nor in the properties of the final product. Increasing the amount of papain in solution to 3.3% or reducing the amount of papain to 0.67% based on the hide solids also gives satisfactory results.

*Example VIII.—Pepsin*

Commercial limed hides are washed in a drum with 1–2 gallons of water per minute for 8 to 12 hours.

The washed hides are shredded with rapidly rotating knives in a machine of the type conventionally used to shred paper and ground in a meat grinder through ¼ inch holes.

The washed and ground hide (30 parts by weight dry solids) is next treated with 300 parts of a solution containing .1 part by weight pepsin for 18 hours at 22–23° C. The pH of the pepsin solution is 4.

The pepsin treated hide is washed and cut into $\frac{1}{16}''$ particles. These hide particles are then swollen in aqueous acid solution and blended with cellulose fibers to produce an extrusion mass having the following composition:

| | Percent |
|---|---|
| Hide solids | 3.6 |
| Cellulose fibers | 0.76 |
| Lactic acid | 1.2 |
| Water | 94.44 |

The mixture is homogenized and extruded into a saturated ammonium sulfate solution as described in Example I. The breaking strength of the extruded casing as it enters the pre-wash tank 15 is 480 rams. The extruded casing is prewashed in 14% aqueous ammonium sulfate solution for about 24 minutes and hardened in an aqueous solution containing 3% alum, $NH_4Al(SO_4)_2 \cdot 24H_2O$, 0.67 citric acid and 3.2% ammonium sulfate adjusted to pH 4.3 with ammonium hydroxide. The strength of the casing in the alum hardening tank 16 is 450 grams. The casing remains in this hardening solution for about 35 minutes, and is washed with water for about 2 hours. During the washing step the strength of the casing is 520 grams in tank 18, 520 grams in tank 19 and 300 grams in tank 20. The washed casing is plasticized for about 15 minutes with an aqueous solution containing 3% glycerol and 1% C.M.C. (the sodium salt of carboxymethyl cellulose). The strength of the casing in the plasticizing bath is 360 grams. The plasticized casing is dried in an inflated condition for about 3 minutes at about 80° C., and shirred. The shirred casing is heated slowly from room temperature to 80° C. over a period of 8 hours and finally is heated for another 16 hours at about 80° C. The stuffing and linking properties of the casing so obtained are satisfactory. Sausages manufactured with this casing survive cooking, i.e., do not rupture, split or melt.

In a series of experiments with the enzyme pepsin the pH of the enzyme solution is adjusted to 6, 7.5 and 9, while the other conditions of this Example VIII remained unchanged. The collagen mass so obtained may be extruded to form a satisfactory casing. Decreasing the amount of pepsin in solution to 0.166% or increasing the amount of pepsin in solution to 0.67% based on the dry hide solids also gives satisfactory results.

*Example IX.—Steapsin*

Commercial limed hides as received from the tannery are washed in a drum with 1–2 gallons of water per minute for 8 to 12 hours.

The washed hides are shredded with rapidly rotating knives in a machine of the type conventionally used to shred paper and ground in a meat grinder through ¼ inch holes.

The washed and ground hide (30 parts dry solids) is next treated with 300 parts of an aqueous solution containing 3.33% steapsin based on the dry weight of the hide solids for 18 hours at 22–23° C. The pH of the steapsin solution is buffered to 7.5 with sodium dihydrogen phosphate-disodium hydrogen phosphate.

The steapsin treated hide is washed and cut into $\frac{1}{16}''$ particles. These hide particles are then swollen in aqueous acid solution and blended with cellulose fibers to produce an extrusion mass containing 3.6% hide solids, 0.76% cellulose fibers, 1.2% lactic acid, and 94.44% water.

The mixture is homogenized and extruded into a saturated ammonium sulfate solution as described in Example I. The breaking strength of the extruded casing as it enters the pre-wash tank 15 is 800 grams. The extruded casing is pre-washed in 14% aqueous ammonium sulfate solution for about 24 minutes and hardened in an aqueous solution containing 3% alum, $NH_4Al(SO_4)_2 \cdot 24H_2O$, 0.67% citric acid and 3.2% ammonium sulfate adjusted to pH 4.3 with ammonium hydroxide. The strength of the casing in the pre-wash tank 15 is 600 grams and the casing strength in the alum hardening tank 16 to also 600 grams. The casing remains in this hardening solution for about 35 minutes, and is washed with water for about 2 hours. During the washing step the strength of the casing is 750 grams in tank 18, 700 grams in tank 19 and 750 grams in tank 20. The washed casing is plasticized for about 15 minutes with an aqueous solution containing 3% glycerol and 1% C.M.C. (the sodium salt of carboxymethyl cellulose). The strength of the casing in the plasticizing bath is 750 grams. The plasticized casing is dried in an inflated condition for about 3 minutes at about 80° C., and shirred. The shirred casing is heated slowly from room temperature to 80° C. over a period of 8 hours and finally is heated for another 16 hours at about 80° C. The stuffing and linking properties of the casing so obtained are satisfactory. Sausages manufactured with this casing survive cooking, i.e., do not rupture, split or melt.

In a series of experiments with the enzyme steapsin the pH of the enzyme solution is adjusted to 4, 6, and 9, while the other conditions of this Example IX remained unchanged. In each of these experiments the collagen mass could be extruded to form a satisfactory casing. Decreasing the amount of steapsin in solution to 1.67% or increasing the amount of steapsin in solution to 12% based on the dry hide solids also gives satisfactory results although no real advantage is noted that would justify the expense of using these larger quantities of enzyme (and removing the residual enzyme from the hide after enzyme treatment).

*Example X.—Trypsin*

Commercial limed hides as received from the tannery are washed in a drum with 1–2 gallons of water per minute for 8 to 12 hours.

The washed hides are shredded with rapidly rotating knives in a machine of the type conventionally used to shred paper and ground in a meat grinder through ¼ inch holes.

The washed and ground hide (30 parts dry solids) is next treated with 300 parts of an aqueous solution containing 1.67% trypsin based on the hide solids for 18 hours at 22–23° C. The pH of the trypsin solution is 4.

The trypsin treated hide is washed and cut into $\frac{1}{16}''$ particles. These hide particles are then swollen in aqueous acid solution and blended with cellulose fibers to produce an extrusion mass having the following composition:

| | Percent |
|---|---|
| Hide Solids | 3.6 |
| Cellulose fibers | 0.76 |
| Lactic acid | 1.2 |
| Water | 94.44 |

The mixture is homogenized and extruded into a saturated ammonium sulfate solution as described in Example I. The breaking strength of the extruded casing as it enters the pre-wash tank 15 is 700 grams. The extruded casing is pre-washed in 14% aqueous ammonium sulfate solution for about 24 minutes and hardened in an aqueous solution containing 3% alum, 0.67% citric acid and 3.2% ammonium sulfate adjusted to pH 4.3 with ammonium hydroxide. The strength of the casing in the pre-wash tank 15 is 450 grams and the casing strength increases in the alum hardening tank 16 to 600 grams. The casing remains in this hardening solution for about 35 minutes, and is washed with water for about 2 hours. During the washing step the strength of the casing is 500 grams in tank 18, 450 grams in tank 19 and 425 grams in tank 20. The washed casing is plasticized for about 15 minutes with an aqueous solution containing 3% glycerol and 1% C.M.C. (the sodium salt of carboxymethyl cellulose). The strength of the casing in the plasticizing bath is 400 grams. The plasticized casing is dried in an inflated condition for about 3 minutes at about 80° C., and shirred. The shirred casing is heated slowly from room temperature to 80° C. over a period of 8 hours and finally is heated for another 16 hours at about 80° C. The stuffing and linking properties of the casing so obtained are satisfactory. Sausages manufactured with this casing survive cooking, i.e., do not rupture, split or melt.

In a series of experiments with the enzyme trypsin the pH of the enzyme solution is adjusted to 6, 7.5 and 9, and the concentration of enzyme in solution is changed to between 0.167% and 3.33% based on the dry hide solids while the conditions of this Example X remained unchanged. In each of these experiments the collagen mass could be extruded to form a satisfactory casing.

*Example XI.—Effect of enzyme concentration on digestion time*

In Examples III through X the limed hide is treated with a proteolytic enzyme solution for 18 hours at 22–23° C. To determine the effect of enzyme concentration on time of enzyme treatment (digestion time) limed hide is treated with larger quantities of enzyme for shorter periods of time, and with smaller quantities of enzyme for longer periods of time.

Table 1 summarizes information on the relationship between enzyme concentration and digestion time and indicates conditions found to be satisfactory when following the procedure described in Example III. It will be noted that the digestion time may be varied from about 12 hours to about 24 hours. A digestion time longer than 24 hours becomes increasingly disadvantageous from the standpoint of production capacity. As the digestion time is reduced below 12 hours the difficulty of controlling the action of the enzyme to prevent adverse modification of the collagen is increased.

TABLE 1.—DIGESTION TIME-ENZYME CONCENTRATION

| Enzyme | Digestion Time, Hours | | |
|---|---|---|---|
| | 12 Percent | 18 Percent | 24 Percent |
| Ficin | 1 | .67 | .33 |
| α-Amylase | 4.7 | 3.3 | 2.3 |
| Bromelin | 4.7 | 3.3 | 2.3 |
| Pancreatin | 9 | 6.7 | 4.3 |
| Papain | 4.7 | 3.3 | 2.3 |
| Pepsin | 1 | .67 | .33 |
| Steapsin | 4.7 | 3.3 | 2.3 |
| Trypsin | 2.3 | 1.7 | 1 |

In Table 1 the enzyme concentration is based on the weight of dry hide solids.

*Example XIII.—Effect of enzyme concentration on digestion temperature*

In Example III through X the limed hide is treated with an enzyme solution for 18 hours at 22°–23° C. To determine the effect of enzyme concentration on the temperature of the enzyme solution (digestion temperature) limed hide is treated with larger quantities of enzyme at a lower temperature and with smaller quantities of enzyme at elevated temperature.

Table 2 summarizes information on the relationship between enzyme concentration and digestion temperature and indicates conditions found to be satisfactory when following the procedure described in Example III. It will be noted that the digestion temperature may be varied from about 10° C. to about 35° C.

TABLE 2.—DIGESTION TEMPERATURE-ENZYME CONCENTRATION

| Enzyme | Digestion Temperature (° C.) | | |
|---|---|---|---|
| | 10° Percent | 22.5° Percent | 35° Percent |
| Ficin | 2.0 | .67 | .33 |
| α-Amylase | 10 | 3.3 | 1.6 |
| Bromelin | 10 | 3.3 | 1.6 |
| Pancreatin | 20 | 6.7 | 3.3 |
| Papain | 10 | 3.3 | 1.65 |
| Pepsin | 2 | .67 | .33 |
| Steapsin | 10 | 3.3 | 1.65 |
| Trypsin | 5 | 1.65 | .83 |

In Table 2 the enzyme concentration is based on the weight of dry hide solids.

*Example XIII*

The procedure described in Example I above is repeated, substituting in place of the hardwood cellulose fibers, starch granules. The extrusion mass has the following compositions:

| | Percent |
|---|---|
| Ficin treated limed hide solids | 3.8 |
| Starch | 0.7 |
| Lactic Acid | 1.2 |
| Water | 94.3 |

The fluid mass of swollen collagen extrudes satisfactorily and may be processed in the usual manner without breakage. The extruded casing is pre-washed in 14% aqueous ammonium sulfate solution for about 24 minutes and handened in an aqueous solution containing 3% alum, 0.67% citric acid, and 3.2% ammonium sulfate adjusted to pH 4.3 with ammonium hydroxide. The casing remains in this hardening solution for about 35 minutes, and is washed with water for about 2 hours. The washed casing is plasticized for about 15 minutes with an aqueous solution containing 3% glycerol and 1% C.M.C. (the sodium salt of carboxymethly cellulose. The plasticized casing is dried in an inflated condition for about 3 minutes at about 80° C., and shirred. The casing so obtained contains starch particles encapsulated in the wall thereof. The shirred casing is heated slowly from room temperature to 80° C. over a period of 8 hours and finally it is heated for another 16 hours at about 80° C. The stuffing and linking properties of this casing are satisfactory, and sausages manufactured therefrom survive cooking.

In a series of experiments using cornstarch as a non-collagenous filler, the amount of starch is varied from 10% to 25% by weight of the collagen solids. There is no alteration of the extrusion properties of the collagen mass and alteration of the starch content within this range did not adversely affect the properties of the final product.

Casing made by the method described above are of uniform diameter and wall thickness. The casing wall is a smooth continuous film containing cowhide collagen fibrils that lie generally parallel to the surface of the casing. The stuffing and linking properties of the casing so obtained are satisfactory. Sausages manufactured with this casing do not rupture, split or melt on cooking.

What is claimed is:
1. In the method of producing a tubular collagen casing from limed cowhide, the steps of:
   comminuting the limed cowhide;
   treating the limed cowhide for from about 12 hours to about 24 hours with an aqueous solution containing from about 0.1% to about 20% of a proteolytic enzyme;
dispersing the enzyme-treated limed cowhide in a dilute aqueous acid solution to produce a fluid mass of acid-swollen enzyme-treated limed cowhide collagen;
extruding a continuous tubular body from said fluid mass of acid-swollen collagen;
applying an aqueous coagulant solution to said tubular body;
hardening the coagulated body;
washing coagulant from the hardened body; and,
drying said body.

2. The method according to claim 1 wherein the proteolytic enzyme is ficin.

3. The method according to claim 1 wherein the proteolytic enzyme is trypsin.

4. The method according to claim 1 wherein the proteolytic enzyme is pancreatin.

5. The method according to claim 1 wherein the proteolytic enzyme is papain.

6. The method according to claim 1 wherein the proteolytic enzyme is pepsin.

7. In the method of producing a tubular collagen casing from limed cowhide, the steps of:
washing the limed cowhide to remove soluble lime salts;
comminuting the cowhide;
immersing the cowhide for from about 12 hours to about 24 hours in an aqueous solution containing from about .1% to about 20% of a proteolytic enzyme;
dispersing the enzyme-treated limed cowhide in a dilute aqueous acid solution to produce a fluid mass of acid-swollen enzyme-treated limed cowhide collagen;
extruding a continuous, fragile tubular body from said fluid mass of acid-swollen collagen;
applying a coagulant solution to said tubular body;
hardening the coagulated body;
washing coagulant from the hardened body; and
drying said body while maintaining the internal diameter of said body substantially equal to that at which it is extruded.

8. In the method of producing a tubular collagen casing from limed cowhide, the steps of:
treating the limed cowhide with a dilute acid solution to neutralize the lime therein;
washing the cowhide to remove soluble lime salts;
comminuting the cowhide;
immersing the cowhide for from about 12 hours to about 24 hours in an aqueous solution containing from about 0.1% to about 20% of a proteolytic enzyme having a pH between about 4 and 9;
removing residual enzyme from the cowhide;
dispersing the enzyme-treated limed cowhide in a dilute aqueous acid solution to produce a fluid mass of swollen enzyme-treated cowhide collagen;
extruding a continuous, fragile tubular body from said fluid mass of acid-swollen collagen;
applying a coagulant solution to said body to coagulate the collagen therein;
hardening the coagulated body;
water washing the hardened body;
immersing the washed, hardened body in a plasticizing solution;
drying the plasticized body; and,
heat curing said body.

9. In the method of producing a tubular collagen casing from limed cowhide, the steps of:
washing the limed cowhide to remove soluble lime salts;
comminuting the cowhide;
immersing the cowhide for from about 12 hours to about 24 hours in an aqueous solution of a sodium salt of ethylene diamine tetraacetic acid and containing from about 0.1% to about 20% of a proteolytic enzyme;
removing residual enzyme from the cowhide;
dispersing the enzyme-treated limed cowhide in a dilute aqueous acid solution to produce a fluid mass of acid-swollen enzyme-treated limed cowhide collagen;
extruding a continuous, fragile tubular body from said fluid mass of acid-swollen collagen;
applying a coagulant solution to said tubular body;
hardening the coagulated body;
washing coagulant from the hardened body;
drying said hardened body while maintaining the drying body in the form of a tube by inflation with air under pressure; and,
heat curing said body.

10. In the method of producing a tubular collagen casing from limed cowhide, the steps of:
washing the limed cowhide to remove soluble lime salts;
comminuting the cowhide;
immersing the cowhide for from about 12 hours to about 24 hours in an aqueous solution containing from about 0.1% to about 2.0% ficin and having a pH between 4 and 7;
removing residual ficin from the cowhide;
dispersing the enzyme-treated limed cowhide in a dilute aqueous acid solution to produce a fluid mass of acid-swollen enzyme-treated limed cowhide collagen;
extruding a continuous, fragile tubular body from said fluid mass of acid-swollen collagen;
applying a coagulant solution to said tubular body;
hardening the coagulated body;
washing coagulant from the hardened body;
maintaining substantially the same wall thickness in said tubular body throughout the aforesaid steps of coagulating, hardening, and washing said body; and,
drying said hardened body and subjecting it to heated currents of air while maintaining the drying body in the form of a tube by inflation with air under pressure and controlling the pressure of said inflating air so as to maintain the inner diameter of the tube substantially the same as that at which it was extruded in the wet state.

11. In the method of producing a tubular collagen casing from limed cowhide, the steps of:
washing the limed cowhide to remove soluble lime salts;
comminuting the cowhide;
immersing the cowhide for from about 12 hours to about 24 hours in an aqueous solution having a pH between 4.0 and 9.0 and containing from about 0.33% to about 1.0% pepsin;
removing residual pepsin from the cowhide;
dispersing the enzyme-treated limed cowhide in a dilute aqueous solution of lactic acid to produce a fluid mass of acid-swollen enzyme-treated limed cowhide collagen;
extruding a continuous tubular body from said fluid mass of acid-swollen collagen;
passing said tubular body upward through a coagulating solution thereby;
coagulating the collagen in said extruded body;
rendering said coagulated body resistant to water by a hardening agent;
removing the coagulant from said body by washing with water; and,
drying said body in tubular form.

12. The method set forth in claim 11 wherein the drying of said body is effected by inflating the body with gas under pressure;
subjecting the exterior of said body to heat and evaporation; and,
controlling the inflating pressure during drying to maintain the internal diameter of said body substantially equal to that at which it was extruded.

13. In the method of treating limed cowhide to form a fluid mass of acid swollen collagen suitable for extrusion, the improvement comprising the steps of:
washing the cowhide to remove soluble lime salts;
comminuting the cowhide;
immersing the cowhide for from about 12 hours to about 24 hours in an aqueous solution containing from about 0.1% to about 2.0% ficin;
removing residual ficin from the cowhide; and,
dispersing the enzyme-treated limed cowhide in a dilute aqueous acid solution to produce a fluid mass of acid-swollen enzyme-treated limed cowhide collagen.

14. In the method of producing a tubular collagen casing from limed cowhide, the steps of:
comminuting the limed cowhide;
treating the limed cowhide for from about 12 hours to about 24 hours with an aqueous solution containing from about .1% to about 20% of proteolytic enzyme;
dispersing the enzyme-treated limed cowhide in a dilute aqueous acid solution to produce a fluid mass of acid-swollen enzyme-treated limed cowhide collagen;
extruding a continuous tubular body from said fluid mass of acid-swollen collagen;
applying an aqueous coagulant solution to said tubular body;
hardening the coagulated body;
washing coagulant from the hardened body;
drying the body;
stuffing the tubular body with a meat emulsion to form a sausage; and,
cooking the sausage.

References Cited
UNITED STATES PATENTS

| | | | |
|---|---|---|---|
| 2,114,220 | 4/1938 | Freudenberg | 99—176 |
| 3,071,477 | 1/1963 | Klevens | 99—176 |
| 3,123,482 | 3/1964 | Lieberman | 99—176 |
| 3,123,653 | 3/1964 | Lieberman. | |

HYMAN LORD, *Primary Examiner.*